No. 625,369. Patented May 23, 1899.
J. TRIBE.
CENTRIFUGAL SEPARATOR.
(Application filed Feb. 18, 1898.)
(No Model.)
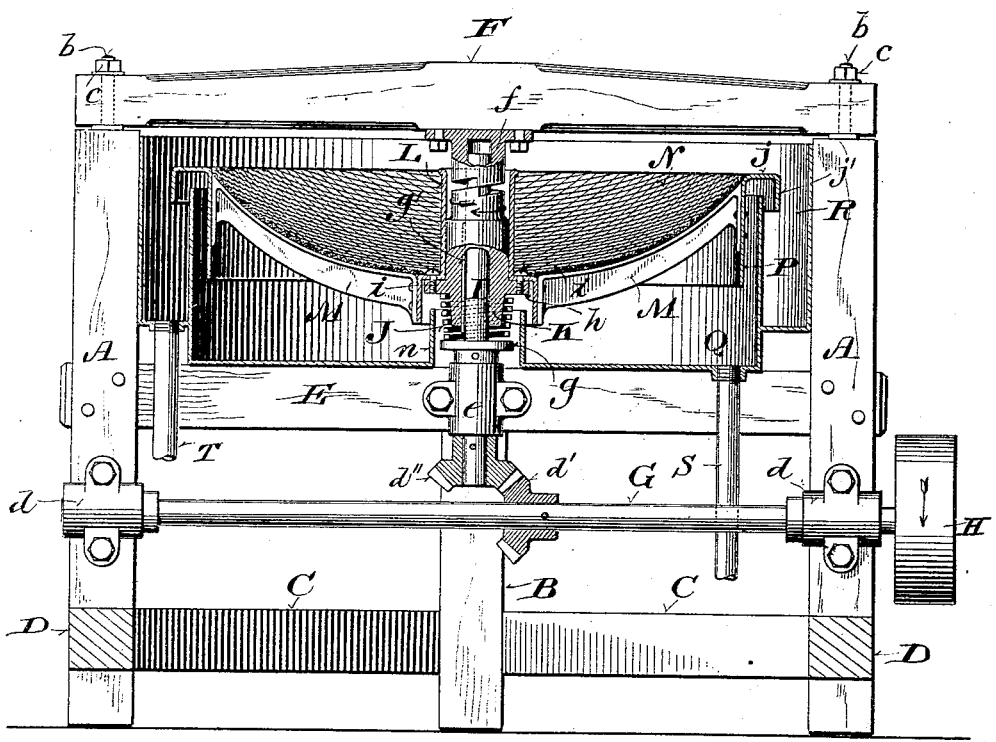

UNITED STATES PATENT OFFICE.

JAMES TRIBE, OF RACINE, WISCONSIN.

CENTRIFUGAL SEPARATOR.

SPECIFICATION forming part of Letters Patent No. 625,369, dated May 23, 1899.

Application filed February 18, 1898. Serial No. 670,803. (No model.)

*To all whom it may concern:*

Be it known that I, JAMES TRIBE, a citizen of the United States, and a resident of Racine, in the county of Racine and State of Wisconsin, have invented certain new and useful Improvements in Separators; and I do hereby declare that the following is a full, clear, and exact description thereof.

My invention has for its object to provide a simple economical machine especially designed for the purpose of thoroughly separating the liquid from the solid in wet grain-mash products.

It therefore consists in certain peculiarities of construction and combination of parts, hereinafter set forth with reference to the accompanying drawing and subsequently claimed.

The drawing represents a vertical transverse section of a machine in accordance with my invention.

Referring by letters to the drawing, the framework, which constitutes part of the preferred form of the machine and is designed to serve principally as a support for the other parts, consists of standards A B, a series of stay-beams C D, that are at right angles to each other, a centrally-located horizontal beam E, all of which are firmly bolted together, and a detachable cross-bar F, secured to the standards A B by studs $b$ and nuts $c$, as herein clearly illustrated.

A horizontal shaft G, having a driving-pulley H rigid thereon, has rotation in bearings $d$ $d$, and by means of gears $d'$ $d''$ power is transmitted from the shaft to a vertical spindle I, which latter is free to revolve in a bearing $e$ (shown on beam E) and also in a stationary socket $f$, depending from cross-bar F, the direction of rotation on the part of said shaft and spindle being indicated by arrows.

The spindle I is provided with a rigid collar $g$ and is supported endwise by this collar on bearing $e$ aforesaid. The spindle is also provided with a longitudinal spline $g'$, that extends a limited distance above the collar $g$, and at rest on the upper face of said collar is a spiral spring J, in opposition to a flange $h$ of a longitudinally-grooved hub engaging said spindle and its spline to have rotation therewith and vertical movement thereon.

The lower face of the stationary socket $f$ and the upper face of hub K form intermatching spiral cams that are held in facial contact with each other by the spring J. Therefore it follows that as the hub is revolved with the spindle I it must gradually descend by virtue of the spiral form of said cams, thereby compressing said spring; but immediately upon release of the cams there will be expansion of the aforesaid spring, causing said hub to suddenly ascend and regain its former position.

Made fast to flange $h$ of hub K by screws $i$ or other suitable means is a tube L, that extends above the opposing faces of the intermatching cams aforesaid, and fast to the lower expanded portion of the tube are a series of arms M for the support of a woven-wire cloth or other suitable porous fabric N, the outer ends of said arms being made fast to a cylindrical fender P, having a horizontal rim $j$, from which a continuous vertical flange $j'$ depends. Tube L, arms M, porous fabric N, fender P, and its flanged rim $j$ constitute what is hereinafter termed a "sieve" and to which is imparted the same twofold motion—viz., rotary and reciprocal—as that of the hub K, to which it is made fast. The sieve has its bottom inclined upward and outward from the center toward the rim as far as the porous fabric extends, and while the inclination of either half of this bottom in cross-section when cut radially by a vertical plane from said center may be a straight line it is preferable that it be curved and that said cross-section of either half approximate a hyperbola, with no part thereof in a true plane, as herein particularly illustrated.

An open-top cylindrical receptacle is provided, and this receptacle comprises two chambers Q and R, concentric to each other. These chambers receive the material under treatment and a central circular aperture is made in the bottom of the inner one, Q, to accommodate the sieve-driving mechanism shown, this aperture being guarded by a cylindrical flange $n$, forming part of said inner chamber. The receptacle, comprising both concentric chambers, is supported on beam E and secured to standards A of the framework above specified. In practice, power having been applied to shaft G and transmitted to spindle I, the material to be treated is run into the sieve as near the center thereof as practicable, and the liquid strains through the porous-fabric portion of said sieve into chamber Q, to find escape through a drain-pipe S or other suitable outlet; but the solids gradually find their way over the sieve-rim $j$ into the chamber R, to be removed through a drain-pipe T or other suitable outlet.

It is obvious that when the wet material comes in contact with the porous-fabric portion of the sieve much of the liquid will immediately pass through the same; but some of the liquid is retained by the solids and thrown upward with the same from said porous fabric by sudden vertical movement of the sieve, repeated at certain intervals in rapid succession. At each successive jump the material is left free for a centrifugal force, attained by rotation of the sieve, to again bring said material in contact with the porous-fabric portion of said sieve, the effect of the resultant concussion being to extract more and more of the moisture by the renewed momentum, as approach is had toward the periphery of the aforesaid sieve, until the proper degree of separation is accomplished, the dry material being discharged over the rim of the aforesaid sieve.

Having thus described my invention, what I claim as new, and desire to secure by Letters Patent, is—

1. In a separator, a spindle, a sieve loose on the spindle, means for imparting rotatory motion to the sieve, and other means for reciprocating said sieve on said spindle.

2. In a separator, a horizontally-disposed sieve provided with a hub, a rotatory spindle with which the sieve-hub has loose spline connection, and means for reciprocating said hub on the spindle.

3. In a separator, a horizontally-disposed sieve provided with a hub having an end thereof in the form of a cam, a rotatory spindle with which the sieve-hub has loose spline connection, a stationary cam arranged to match the hub-cam, and a spring in position to oppose independent thrust of said hub longitudinally of the spindle.

4. In a separator, a horizontally-disposed sieve, provided with a hub and having one of its ends in the form of a cam, a spindle in spline connection with the hub axially of the same, a collar rigid with the spindle, means for imparting rotation to said spindle, a stationary cam intermatching the hub-cam and having an axial cavity engaged by the aforesaid spindle, and a spiral spring intermediate of the spindle-collar and a flange of said hub.

5. In combination with a cylindrical open-top receptacle comprising two concentric chambers each provided with a bottom outlet, a horizontally-disposed rotatory sieve having independent vertical reciprocation in the inner chamber of said receptacle, and a fender constituting part of the sieve provided with an angular rim overlapping the upper edge of said inner chamber.

6. In combination with a cylindrical open-top receptacle comprising two concentric chambers each provided with a bottom outlet, a horizontally-disposed sieve in the inner chamber provided with a hub having an end thereof in the form of a cam, a stationary cam arranged to match that of the hub, a tube extending up from the sieve-bottom to an elevation above the cams, a fender constituting part of the sieve provided with an angular rim overlapping the upper edge of said inner chamber, a rotatory spindle with which the sieve-hub has loose spline connection, and a spring arranged to oppose independent thrust of said hub longitudinally of the spindle.

In testimony that I claim the foregoing I have hereunto set my hand, at Racine, in the county of Racine and State of Wisconsin, in the presence of two witnesses.

JAMES TRIBE.

Witnesses:
A. J. HORLECK,
S. S. ROGERS.